Figure 1:
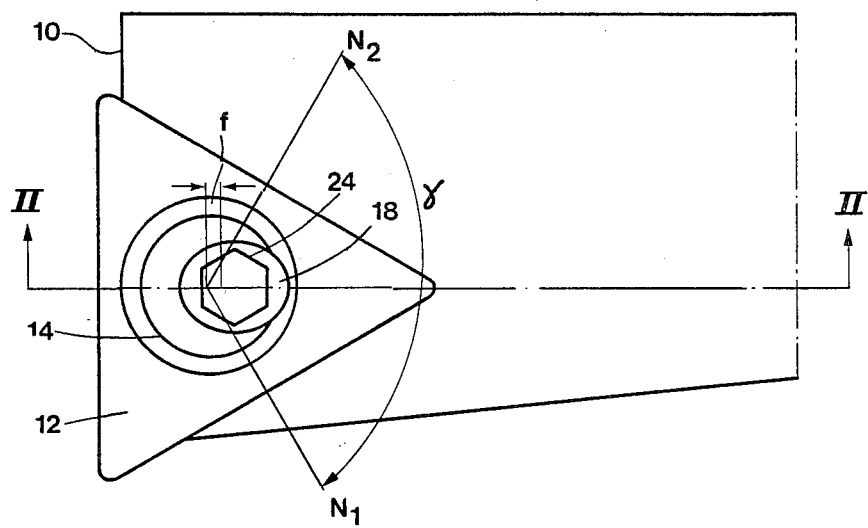

United States Patent [19]

Hellström

[11] 4,430,031
[45] Feb. 7, 1984

[54] CUTTING TOOL

[75] Inventor: Erik I. Hellström, Sandviken, Sweden

[73] Assignee: Santrade Ltd., Luzern, Switzerland

[21] Appl. No.: 311,264

[22] Filed: Oct. 14, 1981

[30] Foreign Application Priority Data

Nov. 17, 1980 [SE] Sweden .................. 8008038

[51] Int. Cl.$^3$ .............................................. B26D 7/26
[52] U.S. Cl. .................................................. 407/104
[58] Field of Search .............. 407/37, 39, 40, 41, 407/42, 104, 113, 114, 116

[56] References Cited

U.S. PATENT DOCUMENTS

| | | | |
|---|---|---|---|
| 3,320,654 | 5/1967 | Lovendahl | 407/104 |
| 3,341,923 | 9/1967 | Kelm . | |
| 3,559,259 | 2/1971 | Kumabe | 407/113 |
| 3,662,444 | 5/1972 | Erkfritz | 407/37 |
| 3,740,807 | 6/1973 | Getts | 407/104 |
| 3,805,351 | 4/1974 | Mayer | 407/104 |
| 3,965,553 | 6/1976 | Faber | 407/104 |
| 4,215,957 | 8/1980 | Holma et al. | 407/104 |

*Primary Examiner*—E. R. Kazenske
*Assistant Examiner*—Paul M. Heyrana, Sr.
*Attorney, Agent, or Firm*—Burns, Doane, Swecker & Mathis

[57] ABSTRACT

This invention relates to a cutting tool comprising a cutting insert holder with a cutting insert positioned in a cutting insert receiving site and provided with a hole. The cutting insert is clamped by a locking screw positioned in the cutting insert hole and threaded into the cutting insert holder. The end part of the locking screw, which end part is positioned in the cutting insert hole, is excentrical relative to the rest of the screw and has a cross section deviating from that of the cutting insert hole. When clamping the cutting insert there is only a point contact between the screw and the cutting insert hole.

6 Claims, 2 Drawing Figures

CUTTING TOOL

This invention relates to a cutting tool comprising a holder and a cutting insert provided with a hole extending through the insert which is placed in a cutting insert receiving site of the holder body. A locking screw placed with thread engagement in a boring in the holder extends into the hole of the cutting insert and is arranged to clamp the cutting insert against a side support in the insert receiving site.

Hitherto known cutting tools of this type usually comprise some kind of pressure generating means arranged in the holder, which means cooperates with one end of a pin in order to bring about the lever movement of the pin. For additional locking means, besides the pin, additional space in the cutting insert holder is required.

According to U.S Pat. No. 3,341,920 a cutting tool is previously known in which only one locking screw is used for the clamping of the cutting insert. This screw entends into the central hole of the cutting insert and is in threaded engagement with the holder body. It is true that the locking screw is the only locking means but instead the wall of the hole of the boring receiving the locking screw, or the support plate of the cutting insert has been designed with a specially formed stop surface with high requirements as to the tolerances in order that by cooperation with the mentioned stop surface the locking screw is imparted a pivotal movement sideways during its threading into the holder, whereby the cutting insert is clamped against an appurtenant side support in the insert receiving site. At the same time there has to be a certain thread loose between the locking screw and the screw hole. Another drawback with this type of cutting insert holder, especially those used for clamping cutting inserts with conical central hole, has been that the locking screw has had to be threaded out wholly when exchanging the cutting insert or when indexing the cutting insert for presenting a new cutting edge.

Each one of German Pat. No. 1,295,967 and U.S. Pat. No. 3,805,351 discloses a cutting tool in which only a central locking screw is used for clamping a cutting insert with a centre hole. In this connection the hole is designed with a sectional form conically decreasing towards the base surface of the cutting insert receiving site and the head of the screw has been given a corresponding conical form. Moreover, the locking screw in these tools is designed with a cylindrical part positioned between the head of the screw and the thread part, which cylindrical part is guided with slip fit in a corresponding cylindrical part of the hole for the screw in the tool. In these embodiments a thorough adaptation of the form is required partly between the screw and the hole of the cutting insert, partly between the screw and the hole of the tool. Moreover, the last mentioned detail design reduces the possibility to achieve a low overall height of the holder.

According to the invention a cutting tool is now presented which solves the above mentioned problems in a simple way. The essential part of the invention is that the end part of the locking screw threaded into the holder of the tool, which end part is positioned in the hole of the cutting insert, is bent such that it is excentrically positioned relative to the rest of the locking screw and has an unsymmetrical cross section that deviates from that of the hole of the cutting insert such that when threading in the locking screw the latter is turned to a position where the mentioned end part only cooperates with the wall of the hole of the cutting insert in one contact point. Due to that fact that important advantage in relation to known tools with central locking screw is achieved that the locking screw needs only to be loosened about $\frac{1}{2}$ revolution before the cutting insert can be taken away from the cutting insert holder in connection with cutting insert exchange. Moreover, the advantage in relation to conventional solutions is that the tool can be given an essentially reduced overall height, is simpler to manufacture and that the tolerance problems can be overcome by the fact that the threaded excenter screw can be set in a desired height position.

Figure 2:
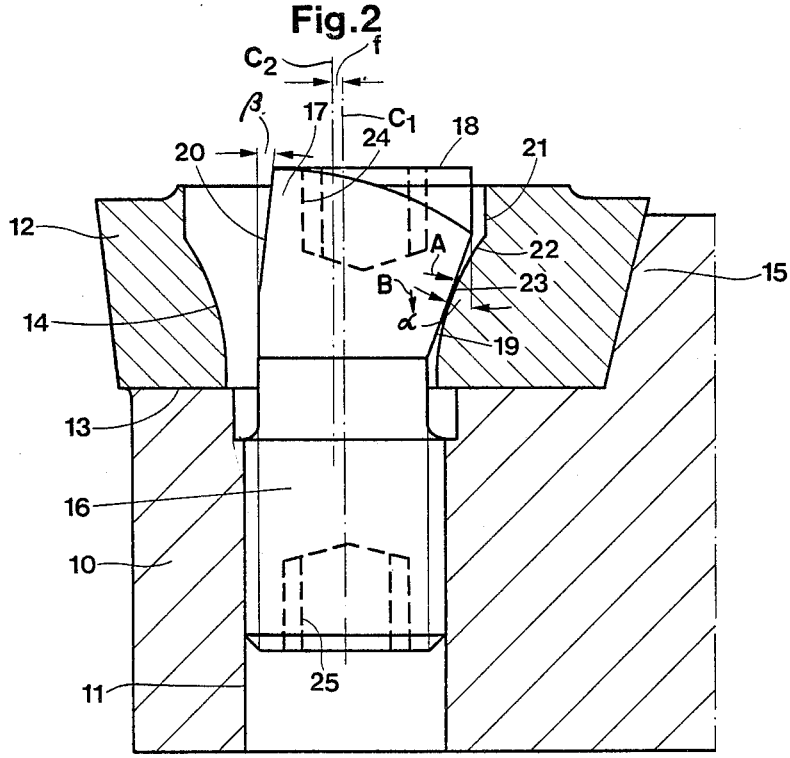

A preferred embodiment of the invention is described more closely in the following in connection with the accompanying drawing figures, in which FIG. 1 is a plan view of the cutting insert holder and in which FIG. 2 is a sectional view along the line II—II of FIG. 1.

In the drawing 10 denotes a cutting insert holder body which is at one end part provided with a cutting insert receiving site with a threaded boring 11 connected to the bottom of the insert receiving site. In the insert receiving site there is arranged a cutting insert 12 resting against a base surface 13. The cutting insert 12 has a central hole 14 extending through the insert, which hole has a section which is reduced in size in direction towards the base surface 13. The base surface 13 forms the bottom support surface for the cutting insert while the side support of the insert receiving site is formed by the surface 15. The insert receiving site is usually limited by a base surface and two side support surfaces. The centre axis of the boring 11 is denoted $C_1$ and is oriented mainly perpendicularly to the base surface 13.

In the boring 11 there is arranged a partly threaded locking screw 16, the head 17 of which is arranged to engage actively with the cutting insert hole 14. The end part 17 of the locking screw 16 is radially bent such that its upper end surface 18 is excentrically positioned in relation to the boring 11.

In order to be able to clamp the cutting insert securely such that it is brought to rest against all support surfaces in the insert receiving site, it is required that the threads of the screw 16 and the boring 11 are designed such that the stop point between the end part 17 and the cutting insert hole 14 is positioned within a sector $\alpha$, the size of which is defined as the angle value between the two normals $N_1$ and $N_2$ of two of the side edges of the cutting insert 12. This is achieved by the fact that the centre axis $C_1$ of the boring 11 is excentrically displaced towards the interior of the cutting insert holder a distance f relative to the centre axis $C_2$ of the cutting insert hole.

In the disclosed embodiment the design of the end part 17 is such that its jacket surface has conical contour with varying inclination angle round its periphery, the contact surface active during the clamping being denoted with 19 while the diametrically opposite cone part is denoted with 20. The first mentioned cone surface 19 has larger inclination angle $\alpha$ relative to a normal of the base surface 13 compared with the corresponding inclination angle $\beta$ of the opposite cone surface 20. The cutting insert hole 14 in the disclosed embodiment is, as mentioned previously, designed with a section the size of which is reduced towards the base surface 13, in this case in the form of a cavity, the upper part 21 of which is cylindrical and the lower contact surface part 22 is convexly narrowed. When threading the screw 16 into the holder 10 the cone surface 19 is applied against the convex hole wall 22 in a contact point 23. The conical contact surface 22 forms an acute angle with the base surface 13 such that the clamping force has components A and B directed toward the side support 15 and the base surface 13, respectively. A characteristic feature of the upper end part of the screw 16 is that it has rounded sectional form with a largest diameter that is less than the least diameter of the cutting insert hole 14 such that after loosening the screw about ½ revolution the cutting insert 12 can be upwardly lifted out of its insert receiving site.

Thus, the locking screw need not be threaded out wholly when taking away the cutting insert.

After indexing a new cutting edge of the existing cutting insert or after exchange to a new cutting insert and localization of the same on the locking screw, the latter is tightened until point contact necessary for the clamping at the contact place 22 has been achieved.

According to an alternative embodiment of the invention the upper end part 17 of the locking screw may at least to a certain extent be convexly designed at the part 19 while the wall of the cutting insert hole 14 is instead conically narrowed towards the base surface 13, in which case there is also a point contact between the locking screw 16 and the cutting insert hole 14 when clamping the cutting insert.

In the embodiment disclosed in FIG. 2 the axis of the locking screw, as stated above, is perpendicular to the base surface 13. According to a preferred alternative embodiment the boring 11 may be somewhat inclined relative to the base surface such that counted from the base surface 13 the boring 11 extends obliquely downwards and outwards towards the end part of the holder. Due to this fact a more clear defined stop surface or stop point at the contact point 23 between the end part 17 of the screw and the cutting insert hole 14 is achieved.

The upper end 17 of the screw 16 is in a usual way provided with a polygonal key grip 24 countersunk in the screw for making the turning of the screw possible with a suitable key tool. In the disclosed embodiment also the opposite end part of the locking screw 16 has been designed with a similar key grip 25, which facilitates the cutting insert exchange when the cutting insert holder has to be mounted with its upside down in a machine.

I claim:

1. A cutting tool comprising:
   a cutting insert holder having an insert-receiving site which includes a base surface, a side support, and a threaded bore in said base surface,
   a positive cutting insert seated within said insert-receiving site in contact with said base surface and side support, said insert having a hole therethrough which includes a first contact surface decreasing in cross-sectional area in a direction toward said base surface,
   a locking screw extending through the hole and threadedly mounted in said bore, said screw including a head disposed within said hole and including a second contact surface engaging said first contact surface and imposing a clamping force thereagainst to clamp said insert to said holder, said head being arranged eccentrically relative to a longitudinal axis of said screw, the largest cross-section of said head being less than the smallest cross-section of said hole such that upon loosening of said screw by about one-half turn said insert is slidably removable over said head,
   one of said first and second contact surfaces being of conical configuration, and the other being of convex configuration to produce point contact therebetween, said conical surface being oriented at an acute angle relative to said base surface so that said clamping force has directional components extending toward said base surface and said side support.

2. A cutting tool according to claim 1, wherein the longitudinal axes of said bore is displaced relative to the longitudinal axis of said hole in a direction away from an effective cutting edge of said insert.

3. A cutting tool according to claim 2, wherein said longitudinal axes of said bore and hole are oriented perpendicularly to said base surface.

4. A cutting tool according to claim 1, wherein said first contact surface is of convex configuration and said second contact surface is of conical configuration.

5. A cutting tool according to claim 4, wherein the conical angle of said second contact surface forms a larger angle relative to a line normal to said base surface than does a conical portion of said head disposed diametrically opposite said second contact surface.

6. A cutting tool according to claim 1, wherein said insert hole includes an upper cylindrical portion disposed above and joined with said first contact surface.

* * * * *